United States Patent
Sisbot

(10) Patent No.: US 9,371,072 B1
(45) Date of Patent: Jun. 21, 2016

(54) LANE QUALITY SERVICE

(71) Applicant: TOYOTA JIDOSHA KABUSHIKI KAISHA, Toyota-shi, Aichi-ken (JP)

(72) Inventor: Emrah Akin Sisbot, Mountain View, CA (US)

(*) Notice: Subject to any disclaimer, the term of this patent is extended or adjusted under 35 U.S.C. 154(b) by 0 days.

(21) Appl. No.: 14/667,361

(22) Filed: Mar. 24, 2015

(51) Int. Cl.
  *G06F 7/00* (2006.01)
  *B60W 40/072* (2012.01)
  *B60W 40/076* (2012.01)
  *B60W 50/14* (2012.01)

(52) U.S. Cl.
  CPC .......... *B60W 40/072* (2013.01); *B60W 40/076* (2013.01); *B60W 50/14* (2013.01); *B60W 2550/14* (2013.01); *B60W 2750/40* (2013.01)

(58) Field of Classification Search
  CPC . B60W 40/072; B60W 40/076; B60W 50/14; B60W 2750/40
  See application file for complete search history.

(56) References Cited

U.S. PATENT DOCUMENTS 8,180,527 B2   5/2012   Mueller-Schneiders et al.
2010/0114431 A1*  5/2010  Switkes .............. B60T 8/17557
                                             701/41
2011/0006903 A1*  1/2011  Niem ................... B60K 28/066
                                             340/576
2013/0282264 A1  10/2013  Bastiaensen et al.

FOREIGN PATENT DOCUMENTS

JP         2011242293 A     12/2011

* cited by examiner

*Primary Examiner* — Ian Jen
(74) *Attorney, Agent, or Firm* — Burbage Law, P.C.; Jon Burbage; Elizabeth Ruzich

(57) ABSTRACT

The disclosure includes a system, method and tangible memory for providing a lane quality service. The system includes a back-up camera mounted to the exterior of a vehicle. The system also includes one or more vibration sensors mounted configured to measure sensor data describing a roadway impairment for a current lane of a roadway. The system also includes an onboard vehicle computer including a lane quality application stored in a tangible memory and a processor. The lane quality application, responsive to being executed by the processor, causes the processor to execute steps including: determining a capture time for executing the back-up camera; executing the back-up camera at the capture time to capture image data describing an image of the roadway impairment; determining location data describing a current geographic location of the roadway impairment; and creating a log that describes the sensor data, the image data and the location data.

20 Claims, 8 Drawing Sheets

LANE QUALITY SERVICE

BACKGROUND

The specification relates to a lane quality service.

Many roadways include multiple lanes for vehicle travel. Different lanes provide a better quality riding experiences than others. For example, some lanes are rough and cause vehicles to shake or cause noise inside the vehicle cabin resulting in a poor quality riding experience for the driver of the vehicle. By comparison, adjacent lanes may be smooth and provide a better quality riding experience.

SUMMARY

If traffic is congested within the roadway, it may be hard for a vehicle to change lanes from a rough road to a smooth road. For example, if the vehicle is in a traffic jam, it may be many minutes before the vehicle can change lanes to a lane providing a smooth driving experience. In some situations a driver may not know that an adjacent lane would provide a better quality riding experience. One innovative aspect of the subject matter described in this disclosure solves the problem of drivers having to travel in rough lanes that provide poor quality riding experiences.

The subject matter described in this disclosure includes a lane quality application for providing a lane quality service. The lane quality application may be included in an embedded system of a vehicle. An onboard computer of the vehicle may include an electronic device that is configured to store and execute the lane quality application. The lane quality application may be stored in a tangible memory of the onboard computer and executed by a processor on the onboard computer. The lane quality application may be communicatively coupled to a network for bidirectional wireless communication with one or more servers.

The vehicle may include one or more vibration sensors mounted to the vehicle. The one or more vibration sensors may measure the vibration of the vehicle as it travels in a lane of a roadway. These measurements may be stored as sensor data. The sensor data may describe one or more roadway impairments detected in the lane being traveled in by the vehicle. The sensor data may be stored in the memory of the onboard computer or some other tangible memory accessible by the processor of the onboard computer.

The lane quality application provides the lane quality service for the vehicle. The lane quality service provides the driver of the vehicle with warnings of upcoming roadway impairments for their current lane and recommendations for a different lane they should be driving in to avoid roadway impairments. For example, the lane quality application may determine the comfortable lanes along the path of the vehicle. The lane quality application may determine whether a lane is comfortable by analyzing the number, degree and type of roadway impairments for the lane. The lane quality application may determine that a lane is comfortable if it is one that will provide the driver with a sufficiently smooth driving experience resulting from the lane being free of inconsistent pavement, a segment of rough road, potholes, notches, scoring, ridges, abrupt changes to roadway elevation and other roadway impairments resulting in poor riding quality for vehicle occupants.

The lane quality application may be configured to monitor the frequency of the warnings it provides to the driver so that the lane quality application does not annoy the driver with too many warnings. For example, if the lane quality application provides the driver with too many warnings over a period of time, then the driver may become annoyed and disable the lane quality application, thereby causing the lane quality application to fall into disuse.

The lane quality application may include an aggregation module. The aggregation module aggregates the sensor data collected by the sensors of the vehicle. The sensor data may describe one or more of the following: one or more roadway conditions; the performance of the vehicle; the quality of the driving lane; and the driver's behavior contemporaneous to the vehicle driving in a particular lane.

The driver's behavior may be determined using internal sensors located inside the vehicle cabin. The internal sensors may include internal cameras, pupil tracking software, heart rate monitors, perspiration monitors, microphones, etc. The driver's behavior may be one or many factors indicating the driving quality of different lanes of the roadway. For example, as explained above, the vehicle may also include one or more vibration sensors that measure the smoothness of the roadway for a particular lane.

The vehicle may also include one or more back-up cameras that capture images of the roadway. For example, the vibration sensors detect a roadway impairment based on vibration of the vehicle and the lane quality application causes the back-up camera to capture an image of the roadway impairment based on the timing. This image may then be tagged with the location data describing the geographic location of the roadway impairment.

In some implementations, one or more innovative aspects of the lane quality service may be provided by a lane quality server. The lane quality server may include a lane analyzer application. The lane analyzer application may wirelessly communicate with a fleet of vehicles within a geographic region. The fleet of vehicles may include two or more vehicles which each include their own lane quality application. The lane analyzer application may aggregate data from the fleet of vehicles to determine the quality of the different lanes included in the geographic region. In this way, the lane quality service may be improved based on the experiences and determinations of many different vehicles.

According to one innovative aspect of the subject matter described in this disclosure, an onboard system of a vehicle may provide the lane quality service via a system, method or tangible memory. The system includes a back-up camera mounted to the exterior of a vehicle. The system also includes one or more vibration sensors mounted to the vehicle and configured to measure sensor data describing a roadway impairment for a current lane of a roadway. The system also includes an onboard vehicle computer including a lane quality application stored in a tangible memory and a processor communicatively coupled to the processor. The lane quality application, responsive to being executed by the processor, causes the processor to execute steps. The steps include determining, based on the sensor data of the vehicle, a capture time for executing the back-up camera. The steps also include executing the back-up camera at the capture time. The capture time is configured so that the back-up camera captures an image of a portion of the current lane which includes the roadway impairment described by the sensor data. The image captured by the back-up camera is described by image data. The steps also include determining location data describing a current geographic location of the roadway impairment. The steps also include creating a log that describes the sensor data, the image data and the location data associated with the roadway impairment.

Other aspects may include corresponding methods, apparatus, and computer program products.

The lane quality application and lane quality service described herein provides numerous benefits not present in prior solutions. For example, a system for implementing the lane quality service includes one or more vibration sensors and microphones installed in a vehicle that generate sensor data indicating the driving quality of different lanes of the roadway. As the vibration sensors collect sensor data, a back-up camera of the vehicle collects images of the roadway. The lane quality application includes code and routines configured to synchronize the vibration sensors and the back-up camera so that the images taken by the back-up camera can be accurately associated with the sensor data corresponding to the vibrations which indicate one or more roadway impairments. The sensor data and the image data may be analyzed by the lane analyzer application included in the lane quality server. The lane analyzer application includes code and routines configured to analyze the sensor data and the image to determine the cause of the roadway impairment.

Another benefit of the lane quality service includes the generation of lane quality data. The lane quality data is specific for a geographic region and describes which lanes in the geographic region have roadway impairments, the portions of the lanes that are actually impaired (since in many cases the entire lane along the entire stretch of the roadway will not be impaired) and the type of roadway impairment associated with each impaired lane portion.

Yet another benefit of the lane quality service includes using the lane quality data to improve the performance of a vehicle. For example, as a vehicle is driving down the roadway, the lane quality application can: (1) determine which lane the vehicle is currently traveling in; (2) determine if a roadway impairment is ahead for the current lane; (3) and provide a warning to the driver indicating that the current lane the vehicle is traveling in will have a roadway impairment.

The lane quality service may improve the performance of a vehicle in other ways. For example, as a vehicle is driving down the roadway, the lane quality application can: (1) determine which lane the vehicle is currently traveling in; (2) determine if a roadway impairment is ahead for the current lane; (3) determine if another lane is available that provides better riding quality; and (4) provide a recommendation to the driver that they should change lanes to the better lane.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
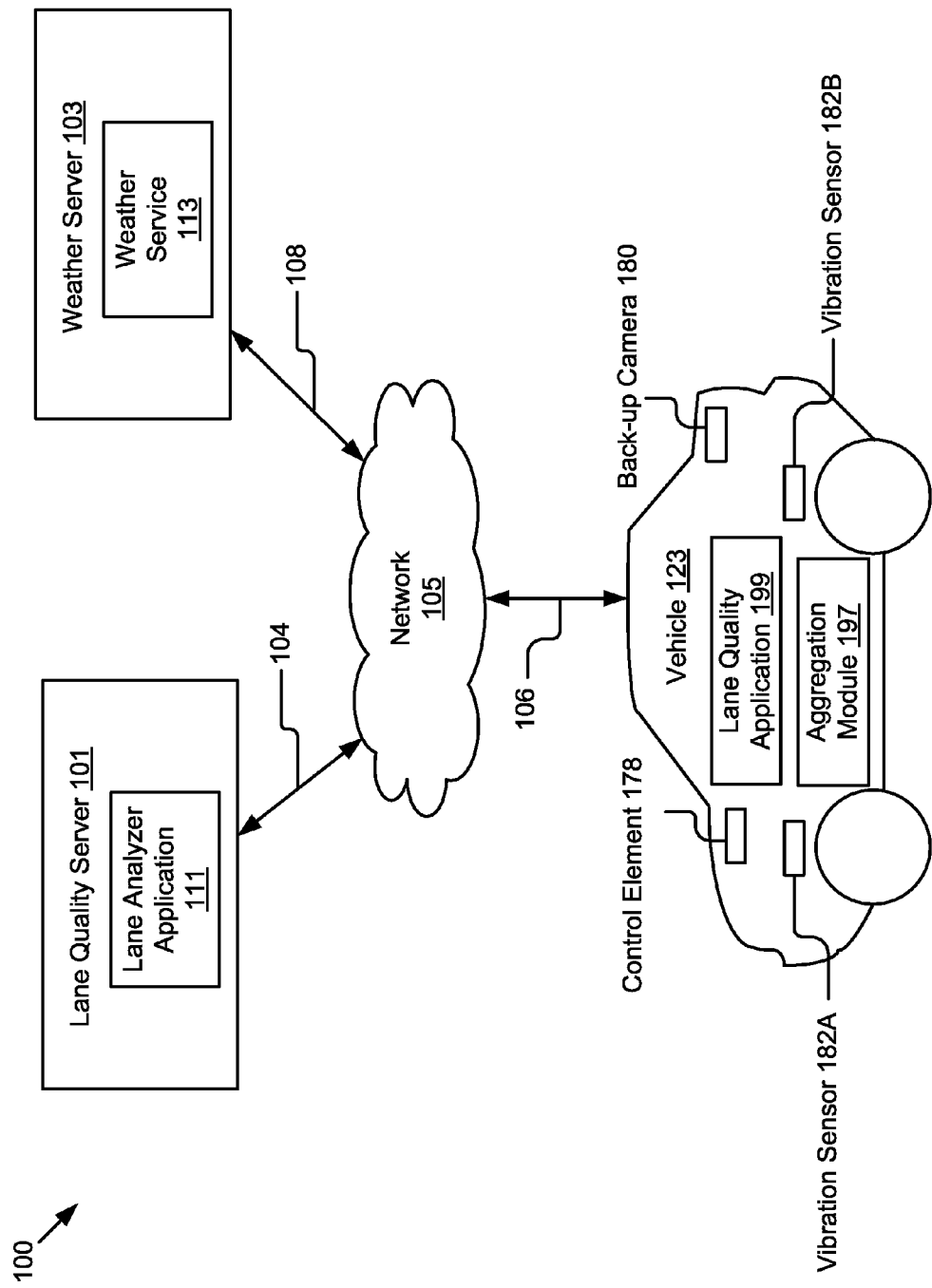
FIG. 1 is a block diagram illustrating an example system for providing a lane quality service for a vehicle.

A vehicle may include: (1) a lane quality application; (2) an aggregation module; (3) vibration sensors; and (4) a communication unit for wireless communication with a lane quality server and, optionally, other nearby vehicles on the roadway. Optionally, the vehicle may include a back-up camera for capturing images of the roadway as the vehicle is in transit, or microphones to measure the noise in the car.

The vibration sensors detect roadway impairments such as rough roads, potholes and any other roadway impairments that result in poor riding quality for vehicle occupants. The vehicle's back-up camera may capture images of the roadway that may be analyzed to determine the type of roadway impairment that caused the vibration. In-cabin microphones can also detect the noise of the road. The aggregation module aggregates the sensor data. The aggregation module uses time synchronicity data to timestamp the sensor data. The aggregation module uses location data to tag the sensor data with a location for the roadway impairment. The location specifies which lane of the roadway is associated with the detected impairment.

The aggregation module associates the image data from the backup camera with the sensor data so that the images may be analyzed to determine the type of roadway impairment that caused the vibrations. The aggregation module includes functionality to synchronize the vibration sensors and the back-up camera so that the images taken by the back-up camera can be accurately associated with the correct vibration data. The images may be analyzed by the lane analyzer application of the lane quality server so that the cause of the roadway impairment can be identified.

Optionally, the aggregation module may generate a log that describes the sensor data and image data associated with the lanes traveled by the vehicle as well as the locations and time synchronicity data associated with the sensor data and the image data.

Optionally, the vehicle can include a button or knob used by the driver to tag a particular location as providing a poor quality riding experience. The driver selects the button or turns the knob to indicate that a lane should be marked as providing a poor quality riding experience. The driver's evaluation can also be obtained by tracking their behavior. For example, if excessive vibration is detected and the driver changed lanes for no reason, the system can infer that the driver was uncomfortable with the lane. The sensors collect sensor data responsive to the user action. The sensor data is then aggregated by the aggregation module as described above.

The communication unit may be configured to enable the vehicle to share sensor data or other data with nearby vehicles on the roadway. For example, the sensor data may be shared via Dedicated Short-Range Communication ("DSRC"), Bluetooth®, Bluetooth Low Energy ("Bluetooth LE") or some other wireless short range communication protocol limited to 0.001 to 100 feet. The communication unit wirelessly transmits the sensor data and the image data to the lane analyzer application of the lane quality server.

The lane quality server may include a cloud server. The lane quality server may include a lane analyzer application. The lane analyzer application analyzes the sensor data and determines lane quality data describing lanes that have roadway impairments, the portions of the lanes that are actually impaired (since in many cases the entire lane along the entire stretch of the roadway will not be impaired) and the type of roadway impairment associated with each impaired lane portion. Optionally, the lane quality data may include a map for a geographic area depicting which lanes of the roadway have impairments, the portions of the lanes that are actually impaired and the type of roadway impairment associated with each impaired lane portion.

Over time, the lane analyzer application builds a database describing the roadway impairments for different geographic locations. Many vehicles are wirelessly connected to the lane analyzer application and provide the lane analyzer application with the sensor data that is used to generate the lane quality data. The lane analyzer application transmits the lane quality data to the lane quality application of the vehicle. Based on the driver feedback, or the driver's lane change behavior, a cloud server can create a personalized lane quality map aggregating similar drivers' or similar cars' data.

The lane quality application is an element of the vehicle. The lane quality application uses the lane quality data to provide warnings and suggestions to the driver of a vehicle. For example, a vehicle is driving along the roadway. The lane quality application of the vehicle determines the location of the vehicle. The lane quality application analyzes the lane quality data for this location to determine if the vehicle's current lane has roadway impairments in the path of the vehicle. If a roadway impairment is ahead of the vehicle on the roadway, the lane quality application provides a warning to the driver of the vehicle. The lane quality application analyzes the lane quality data to determine if a better lane is available to the driver. Optionally, the lane quality application may also analyze real time sensor data to determine if it is safe for the driver to change lanes. This application can also balance the number of lane changes versus the lane quality, and optimize the comfort of the driver on a given path. The lane quality application provides the driver with a recommendation for a different lane that will provide the driver with a better quality riding experience.

Example System Overview

FIG. 1 is a block diagram illustrating an example system 100 for providing a lane quality service for a vehicle 123.

The system 100 includes a vehicle 123, a lane quality server 101 and a weather server 103. In the illustrated example, these entities of the system 100 may be communicatively coupled via a network 105.

The vehicle 123 in FIG. 1 can be used by way of example. While FIG. 1 illustrates vehicle 123, the disclosure applies to a system architecture having one or more vehicles 123. Furthermore, although FIG. 1 illustrates one network 105 coupled to the vehicle 123, the lane quality server 101, and the weather server 103, in practice one or more networks 105 can be connected.

The network 105 can include a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may include a peer-to-peer network. The network 105 may also be coupled to or include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite for providing GPS navigation to the vehicle 123. In some implementations, the network 105 may include a GPS satellite for providing GPS navigation to the vehicle 123. The network 105 may include a mobile data network for example, 3G, 4G, long-term evolution (LTE), Voice-over-LTE ("VoLTE"), or other mobile data network or combination of mobile data networks.

The lane quality server 101 may include a cloud server. For example, the lane quality server 101 may include a computing device storing and executing cloud server software for enabling the lane quality server 101 to provide the service of the lane analyzer application 111. The lane quality server 101 may be communicatively coupled to the network 105 via the signal line 104.

The lane analyzer application 111 may include code and routines for providing one or more aspects of the lane quality service. The functionality of the lane analyzer application is described in more detail below with reference to the lane quality application 199. The lane quality application 111 is also described in more detail below with reference to FIGS. 2-8.

The vehicle 123 may include an automobile, a bus, an airplane, a boat, or other vehicular conveyance. The vehicle 123 may be an electric, hybrid or include an internal combustion engine. In some implementations, the vehicle 123 may include an autonomous vehicle or a semi-autonomous vehicle 123. In some implementations, the vehicle 123 may include a semi-autonomous vehicle 123 in which the vehicle 123 controls at least part of the steering functionality of the vehicle 123.

In some implementations, the vehicle 123 may include an onboard vehicle computer including a memory and a processor. In the illustrated example, the vehicle 123 is communicatively coupled to the network 105 via signal line 106.

The vehicle 123 may include one or more of the following: a control element 178; back-up camera 180; a first vibration sensor 182A and a second vibration sensor 182B (herein referred to individually or collectively as "the vibration sensor 182"); a lane quality application 199; and an aggregation module 197. The aggregation module 197 may be an element of the lane quality application 199.

The control element 178 may include a button, knob or switch which may be selected by a user of the vehicle 123. The user of the vehicle may include a driver of the vehicle 123 or a passenger of the vehicle 123. The user of the vehicle 123 may select the control element 178 to indicate that the vehicle 123 is traveling in a lane which corresponds to what the user considers to be a poor quality riding experience.

The back-up camera 180 may include a digital camera mounted to the vehicle 123. The mounting of the back-up camera 180 may be configured to capture images of the roadway along which the vehicle 123 travels. The back-up camera may be configured to capture high definition images having more than 480 horizontal lines per image. In some implementations, the back-up camera 180 may be configured so that it captures images having 3,000,000 to 34,000,000 pixels per image, with a frame size ranging from 2,048 pixels wide by 1,536 pixels high to 7,680 pixels wide by 4,320 pixels high, respectively. In some implementations, the back-up camera 180 may be configured to capture low-definition images having fewer than 480 horizontal lines per image. The back-up camera 180 may be configured to store image data describing the images captured by the back-up camera 180. The image data may be stored as uncompressed image data or compressed image data.

The vibration sensor 182 may include a hardware vibration sensor mounted to the vehicle 123. The mounting of the vibration sensor 182 to the vehicle 123 may be configured to optimize the ability of the vibration sensor 182 to detect vibrations corresponding to roadway impairments as the vehicle 123 travels along the roadway.

The sensor data describing the vibrations detected by the vibration sensor 182 may be stored in a tangible memory accessible by the lane quality application 199. For example, the sensor data may be stored in the tangible memory of the onboard vehicle computer.

In some implementations, the vehicle 123 may include other sensors in addition to the vibration sensor 182. For example, the vehicle 123 may include one or more microphones mounted to the outside or inside of the vehicle 123 and configured to monitor roadway noise. The audio detected by the microphones may be stored as sensor data in a tangible memory of the vehicle 123.

In some implementations, the vehicle may include one or more internal sensors configured to detect and store sensor data. The internal sensors may include one or more of the following: one or more internal cameras; one or more heart rate monitors; one or more carbon monoxide sensors and one or more perspiration sensors. The internal camera may be mounted to view the driver's face or eyes. The internal camera may include functionality to detect and monitor pupil dilation, eye gaze, or other factors indicating the driver's reaction to the roadway. The measurements detected by the one or more internal sensors may be stored as sensor data in a tangible memory of the vehicle 123.

The aggregation module 197 may include code and routines configured to aggregate sensor data and other data necessary for the lane quality application 199 to provide its functionality. The aggregation module 197 may collect sensor data, detect one or more roadway impairments and determine timing for capturing images of the roadway with the back-up camera, determine location data corresponding to the geographic location of the roadway impairment and create a log describing the sensor data, the image data and the location data associated with the roadway impairment. In this way, the aggregation module 197 may generate the log data describing the log including the sensor data, the image data and the location data associated with a detected roadway impairment.

The aggregation module 197 may be an element of the lane quality application 199. The aggregation module 197 may include functionality to manage the functioning of the vehicle sensors, including the vibration sensor 182 and the back-up camera 180. As the vibration sensor 182 collects sensor data, the back-up camera 180 of the vehicle 123 may collect images of the roadway including, for example, images of the one or more roadway impairments. The aggregation module 197 of the lane quality application 199 includes code and routines configured to synchronize the vibration sensor 182 and the back-up camera 180 so that the images taken by the back-up camera 180 may be accurately associated with the sensor data corresponding to the vibrations which indicate one or more roadway impairments.

The functionality of the aggregation module 197 is described in more detail below with reference to FIGS. 2, 5 and 6.

The lane quality application 199 may include code and routines configured to provide the lane quality service. The lane quality application 199 or the aggregation module 197 may transmit log data describing the log to the network 105.

The log data may be analyzed by the lane analyzer application 111 of the lane quality server 101 to determine the cause of the roadway impairment. Over time, the vehicle 123 may detect different roadway impairments and transmit different instances of log data for each detected roadway impairment. The lane analyzer application 111 may analyze each instance of log data to determine the cause of the roadway impairment associated with the log data.

Each instance of log data received by the lane analyzer application 111 may include sensor data describing, among other things, the vibrations or roadway noises associated with the roadway impairment, image data describing an image of the roadway impairment and location data describing the geographic location of the roadway impairment.

For a given instance of log data, the lane analyzer application 111 may analyze the image data included in the log data to determine the type of roadway impairment. Examples of different types of roadway impairments include: inconsistent pavement; a segment of rough road; potholes; notches; scoring; ridges; abrupt changes to roadway elevation; and other roadway impairments resulting in poor riding quality for vehicle occupants. The lane analyzer application 111 may include functionality to analyze the image data and determine the type of roadway impairment depicted in the image described by the image data. The lane analyzer application 111 may determine lane quality data for the log data based on the type of roadway impairment depicted in the image described by the image data. The lane quality data is described in more detail below. The lane analyzer application 111 may transmit the lane quality data to the network 105. The lane quality application 199 of the vehicle 123 may receive the lane quality data from the network 105.

The lane quality server 101 may include a tangible memory storing a tens, hundreds, thousands or even millions of exemplar images of roadway impairments that may be used by the lane analyzer application 111 to analyze the image data included in the log data to determine the type of roadway impairment depicted in the image data for a given instance of log data. In some implementations, the lane analyzer application 111 may use fingerprint analysis of the image data and the exemplar images to determine the type of roadway impairment depicted in the image data for a given instance of log data.

The lane analyzer application 111 may receive log data from one or more vehicles 123. For example, a fleet of one or more vehicles 123 in a geographic region may provide log data to the lane analyzer application 111 via the network 105. For example, the log data received by the lane analyzer application 111 may include sensor data, image data and location data associated with one or more roadway impairments in the geographic region. One or more of the different vehicles 123 in the geographic region may report the roadway impairments they have detected in the geographic region. Each vehicle 123 that detects a roadway impairment provides its own instance of log data to the lane analyzer application 111. In this way, the lane analyzer application 111 may aggregate different instances of log data for the different roadway impairments in the geographic region. Accordingly, the lane quality data transmitted to the network 105 may describe tens, hundreds, thousands and even millions of different roadway impairments for a given geographic region. The lane quality application 199 of the vehicle 123 may receive the lane quality data from the network 105. In this way, the lane quality application 199 may provide a lane quality service to the vehicle 123 that describes the different roadway impairments for a given geographic region.

The lane quality data may be specific for a geographic region and describe which lanes in the geographic region have roadway impairments, the portions of the lanes that are actually impaired (since in many cases the entire lane along the entire stretch of the roadway will not be impaired) and the type of roadway impairment associated with each impaired lane portion.

The lane quality application 199 may determine the location for the current lane of the vehicle 123. The lane quality application 199 may retrieve lane quality data associated with the current lane. The lane quality application 199 may determine the presence of an upcoming roadway impairment for the current lane. The lane quality application 199 may provide a warning to the driver of the vehicle 123. The warning may be a graphical warning on the display of the head unit or infotainment system of the vehicle 123 or an audible warning.

The lane quality application 199 may determine the presence of a nearby or adjacent lane having better driving conditions. For example, assume that the vehicle 123 is driving in an eight lane highway having four lanes of traffic going in opposite directions. Logically, this means that the vehicle 123 has three alternative lanes in addition to its current lane at any given moment. Responsive to determining the presence of an upcoming roadway impairment for the current lane being traveled in by the vehicle 123, the lane quality application 199 may analyze the lane quality data to determine whether the other three alternative lanes would provide the vehicle 123 with a better riding experience. For example, the lane quality application 199 may determine that one of these alternative lanes would provide the vehicle 123 with a better riding experience based on the lane quality data indicating an absence of upcoming roadway impairments associated with the lane for a given range (e.g., five hundred feet, one quarter mile, half mile, mile, five miles, etc. or any range specified by the driver in their preferences). In some implementations, the given range may be 0.01 to ten miles.

The lane quality application 199 may provide a recommendation to the driver to switch to the alternative lane providing a better riding experience. For example, the navigation system of the vehicle 123 may provide navigation instructions to the driver of the vehicle 123 that will result in the vehicle 123 switching lanes to the alternative lane providing the vehicle 123 with the better riding experience.

In some implementations, the vehicle 123 may be an autonomous or semi-autonomous vehicle. For example, in implementations including autonomous vehicle or semi-autonomous vehicle, the lane quality application 199 may take steps to cause the vehicle 123 to automatically switch lanes after determining navigation instructions that prevent collisions with other objects or vehicles 123 which may be traveling in the current lane or adjacent lanes. The lane quality application 199 may transmit a warning to other vehicles 123 on the roadway before the vehicle 123 switches lanes. For example, the lane quality application 199 may broadcast a warning via DSRC indicating that the vehicle 123 is about to switch lanes.

The lane quality application 199 is described in more detail below with reference to FIGS. 2-8.

The weather server 103 may include a hardware server configured to provide the weather service 113. The weather service 113 may be any electronic weather service accessible by the vehicle 123 via the network 105. The weather service 113 may provide weather data that describes the real-time or near-real-time roadway conditions that may be present on the roadway when a roadway impairment is detected. Optionally, the weather service 113 may provide the lane quality application 199 with weather data that may be considered contemporaneous to analysis of the lane quality data so that the lane quality application 199 can provide improved recommendations for lane changes to the driver of the vehicle 123. For example, if the weather is rainy and the lane quality data indicates that a slick region of roadway is ahead, then the lane quality application 199 may be more likely to recommend a change to a lane that does not include a slick region of roadway.

In some implementations, the lane quality application 199, aggregation module 197 or lane analyzer application 111 can be implemented using hardware including a field-programmable gate array ("FPGA") or an application-specific integrated circuit ("ASIC"). In some other implementations, the lane quality application 199, aggregation module 197 or lane analyzer application 111 can be implemented using a combination of hardware and software. The lane quality application 199, aggregation module 197 or lane analyzer application 111 may be stored in a combination of the devices and servers, or in one of the devices or servers. The lane quality application 199, aggregation module 197 or lane analyzer application 111 may include code and routines configured to perform one or more steps of the methods 600, 700, 800 of FIGS. 6, 7 and 8 when executed by a processor, such as processor 225, described below with reference to FIG. 2.

Example Electronic Devices

Figure 2:
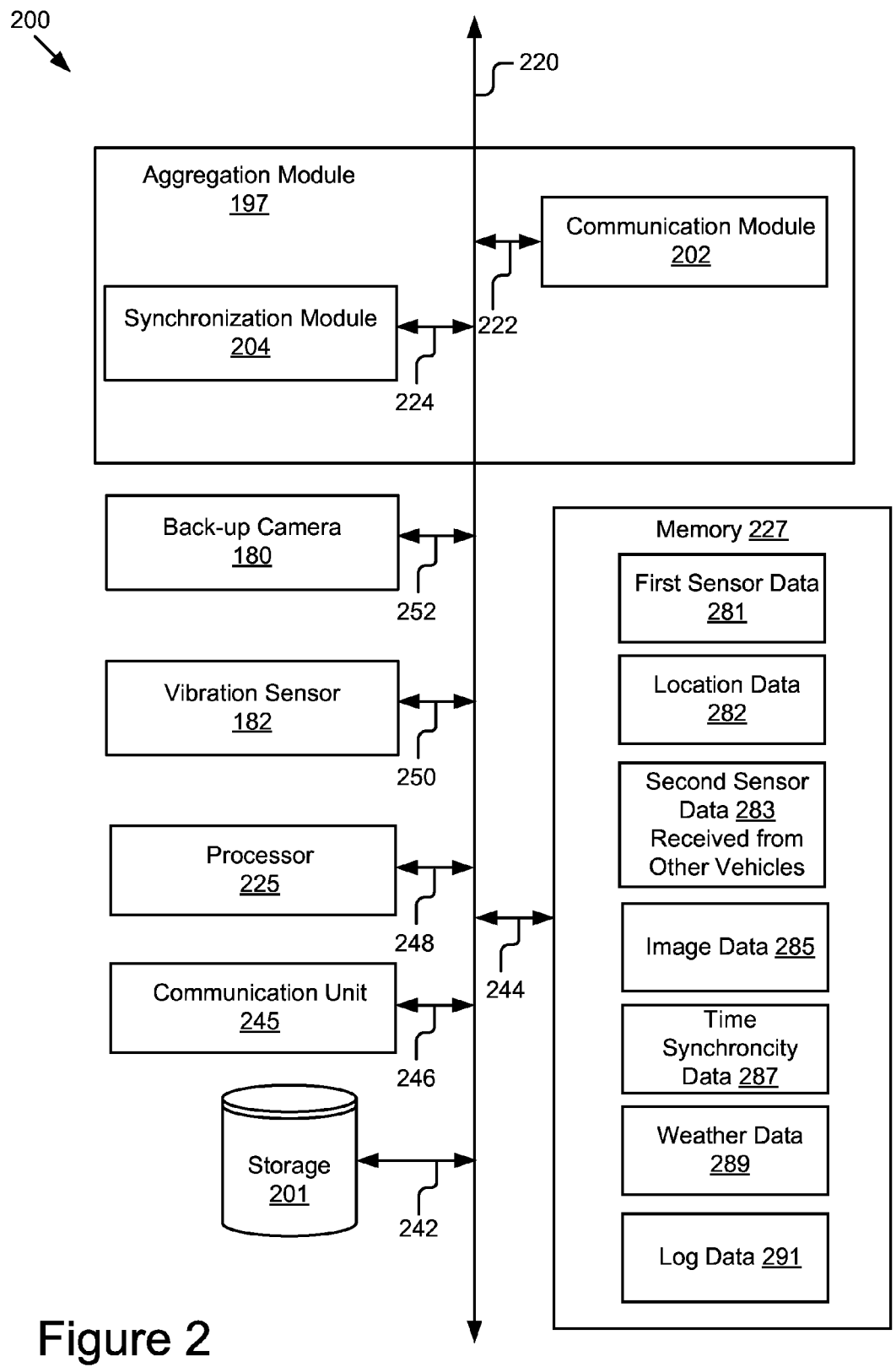
FIG. 2 is a block diagram illustrating an example electronic device for aggregating data.

FIG. 2 is a block diagram illustrating an example electronic device 200 for aggregating data. The electronic device 200 may be an element of an onboard computer of the vehicle 123. In some implementations, the electronic device 200 may include a special-purpose computing device configured to provide some or all of the functionality described below with reference to method 600 of FIG. 6.

The electronic device 200 may include the aggregation module 197, a processor 225, a memory 227, the back-up camera 180, the vibration sensor 182, a communication unit 245 and a storage 201. The components of the electronic device 200 are communicatively coupled by a bus 220.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible. The processor 225 is coupled to the bus 220 for communication with the other components via signal line 248.

The memory 227 is a tangible storage medium that stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 244.

As illustrated in FIG. 2, the memory 227 stores first sensor data 281, location data 282, second sensor data 283, image data 285, time synchronicity data 287, weather data 289 and log data 291.

The first sensor data 281 includes the sensor data measured and recorded by the vibration sensor 182 and the other sensors of the vehicle 123 (such as a microphone) as described above with reference to FIG. 1. The second sensor data 283 includes sensor data received from other vehicles. For example, a first vehicle 123 may be traveling on one lane and a second vehicle 123 may be traveling in an adjacent lane. The electronic device 200 may be an element of the first vehicle 123. The second vehicle 123 may use its sensors to detect the second sensor data 283. However, the second vehicle 123 may not include the lane quality application 199 or the aggregation module 197, and so, the second vehicle 123 may be unable to transmit the second sensor data 283 to the network 105. For example, the second vehicle 123 may be an older, legacy vehicle. However, the second vehicle 123 may transmit the second sensor data 283 to the first vehicle 123. For example, the second vehicle 123 may transmit the second sensor data 283 to the first vehicle 123 via DSRC, Bluetooth, Wi-Fi or some other form of wireless communication. In this way, the first vehicle 123 may transmit the second sensor data 283 to the network 105. Similarly, the second vehicle 123 may also transmit images and location data to the first vehicle 123, which the first vehicle 123 transmits to the network 105. The aggregation module 197 and the lane quality application 199 may therefore enable legacy vehicles to enhance the quality of the lane quality data provided by the lane quality service. In so doing, the aggregation module 197 and the lane quality application 199 may enable the first vehicle 123 to benefit from its own sensors as well as the sensors of other legacy vehicles on the roadway at the same time.

The location data 282 describes the geographic location of the vehicle's current lane when a roadway impairment is detected. The location data 282 may be determined based on the GPS coordinates provided by the GPS receiver of the vehicle 123.

The image data 285 describes one or more images captured by the back-up camera 180. For example, the image data 285 may describe an image of a roadway impairment.

The time synchronicity data 287 describes a common time value shared by all vehicles 123 which belong to a particular fleet of vehicles 123. An ordinary fleet of vehicles may include many vehicles which each have their own clock and their own time value so that there is variance within the fleet about the time at any given moment. The time synchronicity data 287 beneficially enables all the vehicles 123 included in the fleet of vehicles which participate in the lane quality service to have a common time value that is shared by all the vehicles 123 in the fleet of vehicles 123.

The weather data 289 includes a description of the current or contemporaneous weather as provided by the weather service 113.

The log data 291 includes the first sensor data 281, image data 285 and location data 282 for a given roadway impairment. The vehicle 123 may detect many roadway impairments over time. The log data 291 may include data for the different roadway impairments detected by the vehicle 123. The log data 291 may be organized so that the first sensor data 281, image data 285 and location data 282 for a given roadway impairment are associated with one another. In this way, the log data 291 may describe one or more roadway impairments while still being organized so that the lane analyzer application 111 of the lane quality server 101 may distinguish the first sensor data 281, image data 285 and location data 282 for a particular roadway impairment from the data 281, 285, 282 for other roadway impairments.

The storage 201 may include a tangible memory. The storage 201 is an optional feature of the electronic device 200. The storage 201 may include a buffer or some other temporary storage element. The storage 201 is communicatively coupled to the bus 220 via a signal line 242.

The communication unit 245 may include hardware that transmits and receives data to and from the network 105. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The back-up camera 180 and the vibration sensor 182 were described above with reference to FIG. 1, and so, these descriptions will not be repeated here. The back-up camera 180 is communicatively coupled to the bus 220 via the signal line 252. The vibration sensor 182 is communicatively coupled to the bus 220 via the signal line 250.

In some implementations, the aggregation module 197 includes a communication module 202 and a synchronization module 204. The communication module 202 is communicatively coupled to the bus 220 via signal line 222. The synchronization module 204 is communicatively coupled to the bus 220 via signal line 224.

The communication module 202 may include code and routines configured to handle communications between the aggregation module 197 and other components of the electronic device 200. In some implementations, the communication module 202 can include a set of instructions executable by the processor 225 to provide the functionality described below for handling communications between the aggregation module 197 and other components of the electronic device 200. In some implementations, the communication module 202 can be stored in the memory 227 of the electronic device 200 and can be accessible and executable by the processor 225.

The communication module 202 sends and receives data, via the communication unit 245, to and from the network 105. For example, the communication module 202 receives, via the communication unit 245, weather data 289 from the network 105. The communication module 202 sends the log data 291 to the network 105.

In some implementations, the communication module 202 receives data from components of the electronic device 200 and stores the data in the memory 227. For example, the communication module 202 receives data from the vibration sensor 182 and stores it as first sensor data 281 in the memory 227.

In some implementations, the communication module 202 may handle communications between components of the aggregation module 197. For example, the communication module 202 receives image data 285 and first sensor data 281 from the memory 227 and transmits the image data 285 and first sensor data 281 to the synchronization module 204.

The synchronization module 204 may include code and routines configured to synchronize the vibration sensor 182 and the back-up camera 180 so that the images taken by the back-up camera 180 are accurately associated with the first sensor data 281 corresponding to the vibrations which indicate one or more roadway impairments.

Figure 3:
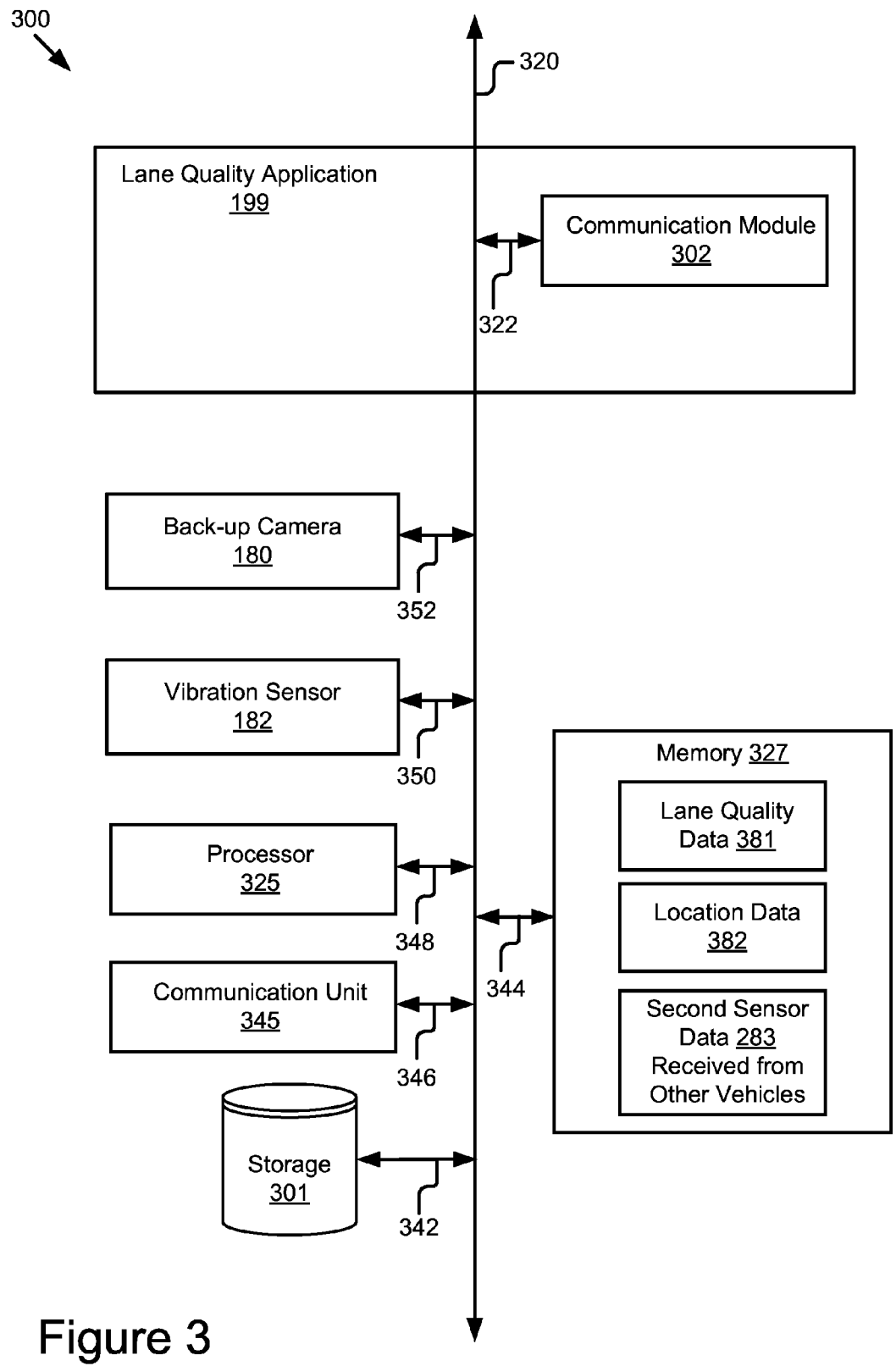
FIG. 3 is a block diagram illustrating an example electronic device for providing a lane quality service.

Turning now to FIG. 3. FIG. 3 is a block diagram illustrating an example electronic device 300 for providing the lane quality service. The electronic device 300 may be an element of an onboard computer of the vehicle 123. In some implementations, the electronic device 300 may include a special-purpose computing device configured to provide some or all of the functionality described below with reference to method 800 of FIG. 8.

The electronic device 300 may include the lane quality application 199, a processor 325, a memory 327, the back-up camera 180, the vibration sensor 182, a communication unit 345 and a storage 301. These elements of the electronic device 300 are communicatively coupled to the bus 320. The processor 325 is communicatively coupled to the bus 320 via signal line 348. The memory 327 is communicatively coupled to the bus 320 via signal line 344. The back-up camera 180 is communicatively coupled to the bus 320 via signal line 352. The vibration sensor 182 is communicatively coupled to the bus 320 via signal line 350. The communication unit 345 is communicatively coupled to the bus 320 via signal line 346. The storage 301 is communicatively coupled to the bus 320 via signal line 342.

The back-up camera 180 and the vibration sensor 182 were described above with reference to FIG. 1, and so, these descriptions will not be repeated here. The processor 325, the communication unit 345, the storage 301 and the memory 327 include functionality similar to the processor 225, the communication unit 245, the storage 201 and the memory 227 described above with reference to FIG. 2, and so, these descriptions will not be repeated here.

The memory 327 stores lane quality data 381, location data 382 and the second sensor data 283. The lane quality data 381 includes the same functionality as the lane quality data described above with reference to FIG. 1, and so, that description will not be repeated here. The location data 382 describes the present location of the vehicle. The second sensor data 283 was described above with reference to FIG. 2, and so, this description will not be repeated here.

The lane quality application 199 includes a communication module 302. The communication module 302 is communicatively coupled to the bus 320 via signal line 322. The communication module 302 provides similar functionality as the communication module 202 described above with reference to FIG. 2, and so, that description will not be repeated here.

The functionality of the lane quality application 199 was described above with reference to FIG. 1, and so, that description will not be repeated here.

Figure 4:
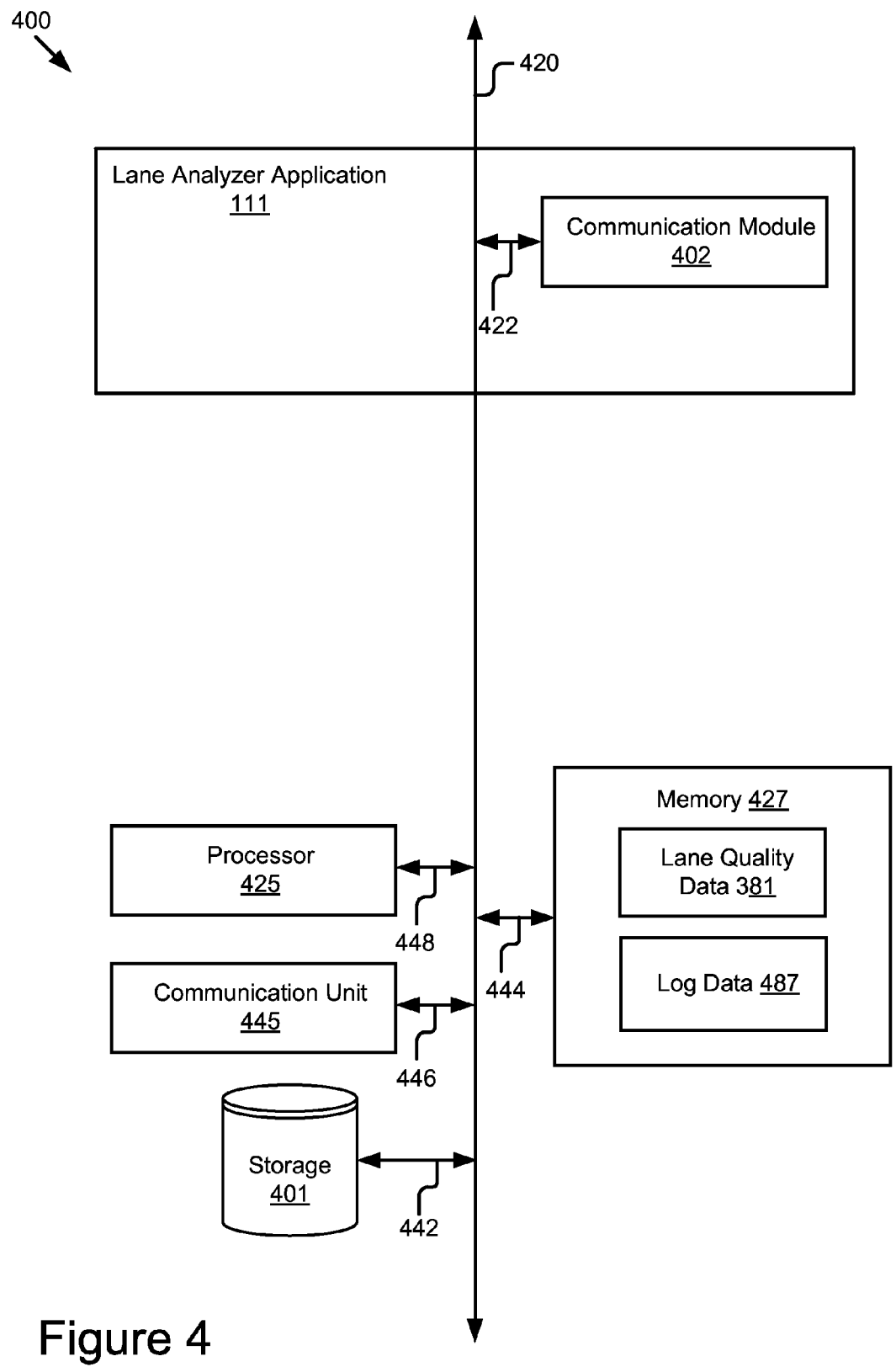
FIG. 4 is a block diagram illustrating an example electronic device for analyzing log data and determining lane quality data.

Turning now to FIG. 4. FIG. 4 is a block diagram illustrating an example electronic device 400 for analyzing log data 487 and determining lane quality data 381. The electronic device 400 may be an element of the lane quality server 101.

In some implementations, the electronic device 400 may include a special-purpose computing device configured to provide some or all of the functionality described below with reference to method 700 of FIG. 7.

The electronic device 400 may include the lane analyzer application 111, a processor 425, a memory 427, a communication unit 445 and a storage 401. These elements of the electronic device 400 are communicatively coupled to the bus 420. The processor 425 is communicatively coupled to the bus 420 via signal line 448. The memory 427 is communicatively coupled to the bus 420 via signal line 444. The communication unit 445 is communicatively coupled to the bus 420 via signal line 446. The storage 401 is communicatively coupled to the bus 420 via signal line 442.

The processor 425, the communication unit 445, the storage 401 and the memory 427 include functionality similar to the processor 225, the communication 245, the storage 201 and the memory 227 described above with reference to FIG. 2, and so, these descriptions will not be repeated here.

The memory 427 stores lane quality data 381 and log data 487. The lane quality data 381 includes the same functionality as the lane quality data described above with reference to FIG. 1, and so, that description will not be repeated here. The log data 487 includes the log data 291 described above with reference to FIG. 2. Additionally, the log data 487 may also include log data similar to log data 291, but be provided by different vehicles included in the fleet.

The lane analyzer application 111 includes a communication module 402. The communication module 402 is communicatively coupled to the bus 420 via signal line 422. The communication module 402 provides similar functionality as the communication module 202 described above with reference to FIG. 2, and so, that description will not be repeated here.

The functionality of the lane quality application 111 was described above with reference to FIG. 1, and so, that description will not be repeated here.

Example Roadway

Figure 5:
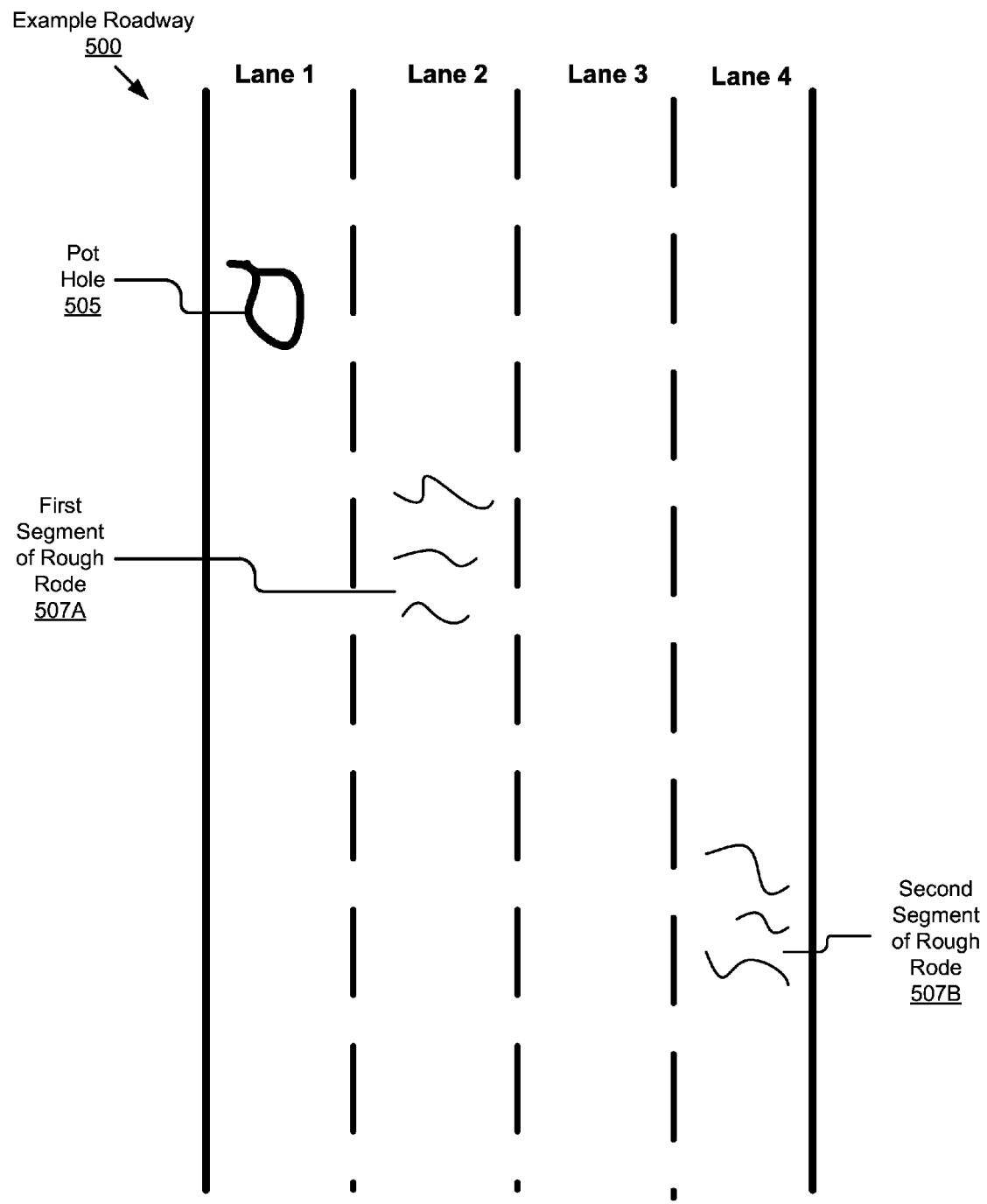
FIG. 5 is a block diagram illustrating a graphic depiction of an example roadway including multiple lanes and roadway impairments.

FIG. 5 is a block diagram illustrating a graphic depiction of an example roadway 500 including multiple lanes and roadway impairments. The example roadway includes four lanes: Lane 1; Lane 2; Lane 3; and Lane 4. The example roadway 500 includes a pot hole 505 in Lane 1, a first segment of rough rode 507a in Lane 2 and a second segment of rough rode 507b in Lane 4. In this example, the lane quality application 199 may determine that the vehicle 123 should travel in Lane 3 since it does not include any roadway impairments.

Example Methods

Figure 6:
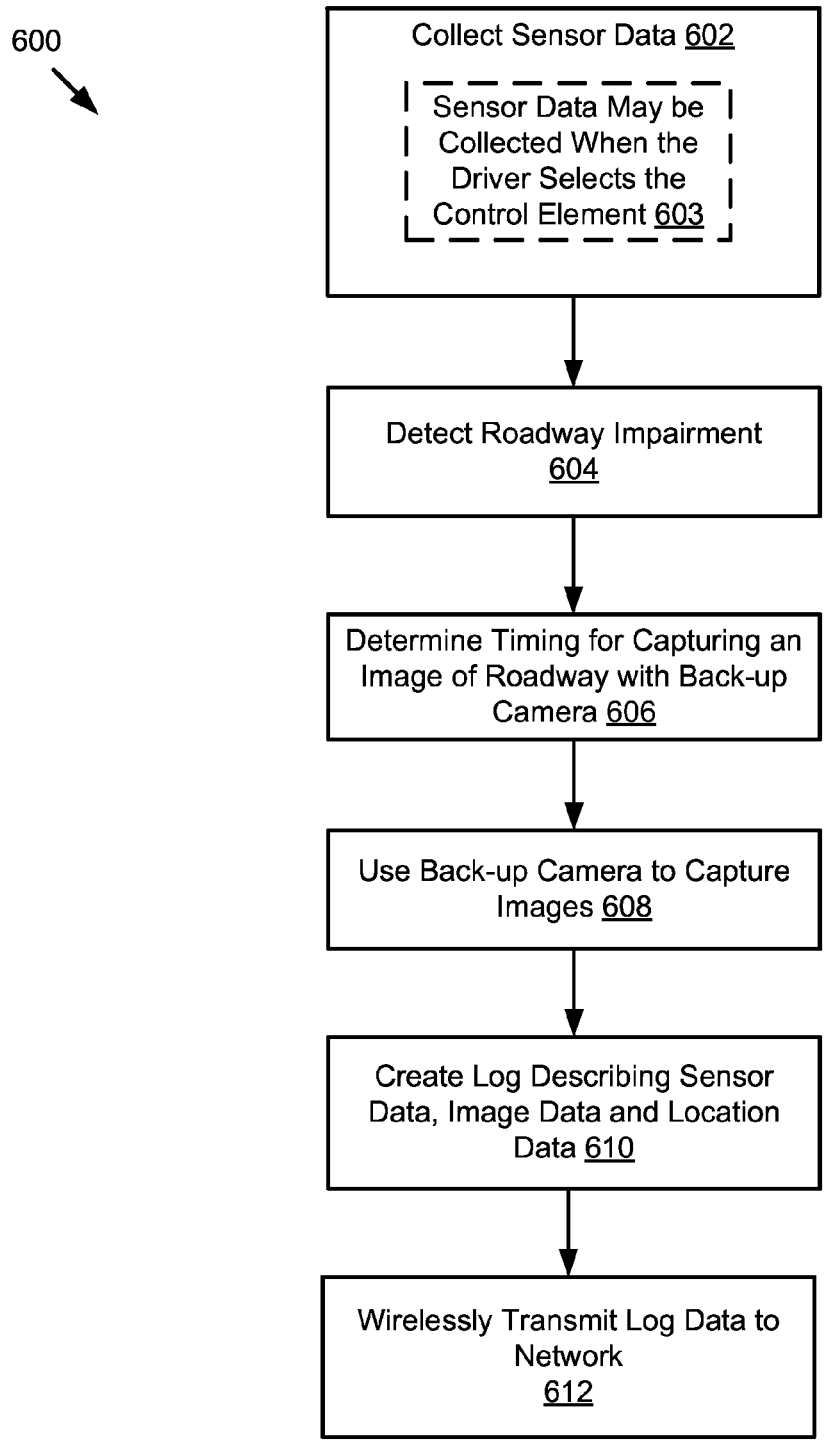
FIG. 6 is a flowchart of an example method for determining and wirelessly transmitting log data to a network.

FIG. 6 is a flowchart of an example method 600 for determining and wirelessly transmitting log data 291 to the network 105. In some implementations, one or more blocks of the method 600 may be performed by the electronic device 200 described above with reference to FIG. 2.

At block 602, sensor data 281 may be collected. The sensor data 281 may be collected from one or more sensors of the vehicle 123. In some implementations, some or all of the sensor data 281 may be received from other vehicles 123. In some implementations, at block 603 the sensor data 281 may be collected when the driver of the vehicle selects the control element 178.

At block 604, a roadway impairment may be detected. At block 606, time for capturing an image of the roadway with the back-up camera 180 may be determined. At block 608, the back-up camera 180 may be executed to capture one or more images of the roadway. The image data 285 describing the one or more images may be tagged with location data 282 describing the geographic location of the roadway impairment. At block 610, a log may be created describing the sensor data 281, image data 285 and the location data 282 associated with the roadway impairment. At block 612, log data 291 describing the log may be transmitted to the network 105. The log data 291 may include descriptions of one or more roadway impairments detected by any positive integer of vehicles 123.

Figure 7:
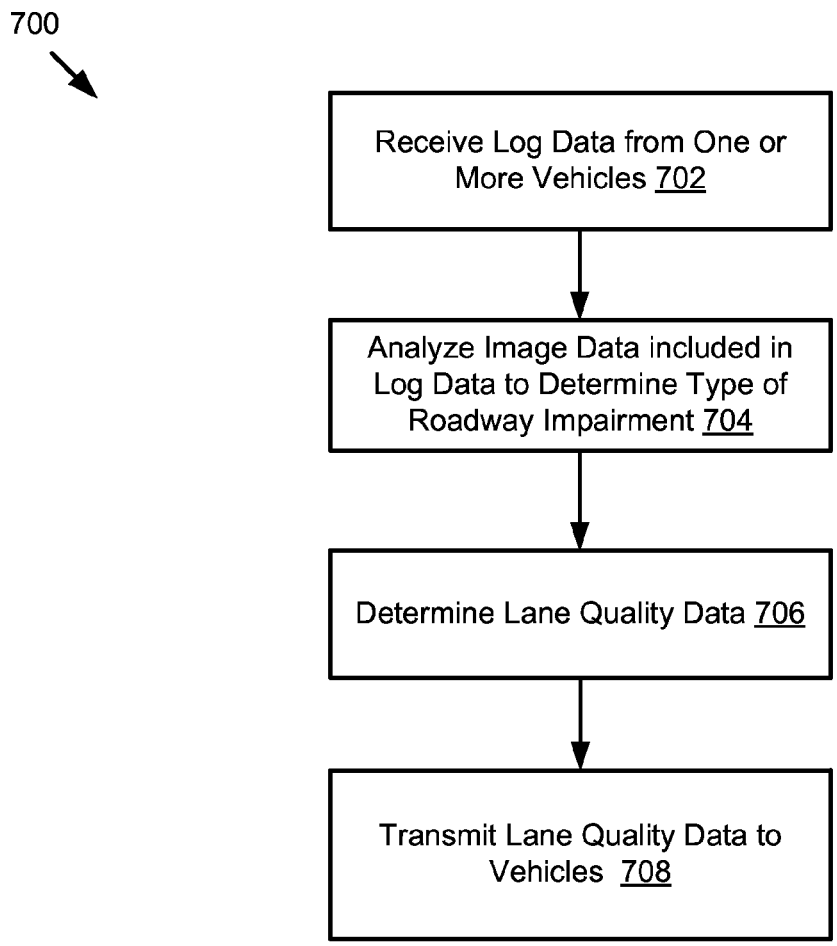
FIG. 7 is a flowchart of an example method for determining and wirelessly transmitting lane quality data to a network.

Turning now to FIG. 7. FIG. 7 is a flowchart of an example method 700 for determining and wirelessly transmitting lane quality data 381 to a network 105. In some implementations, one or more blocks of the method 700 may be performed by the electronic device 400 described above with reference to FIG. 4.

At block 702, the log data 487 may be received. At block 704, the image data 285 included in the log data 487 may be analyzed to determine the type of roadway impairment present in the image. At block 706, the lane quality data 381 may be determined. At block 708, the lane quality data 381 is transmitted to the network 105.

Figure 8:
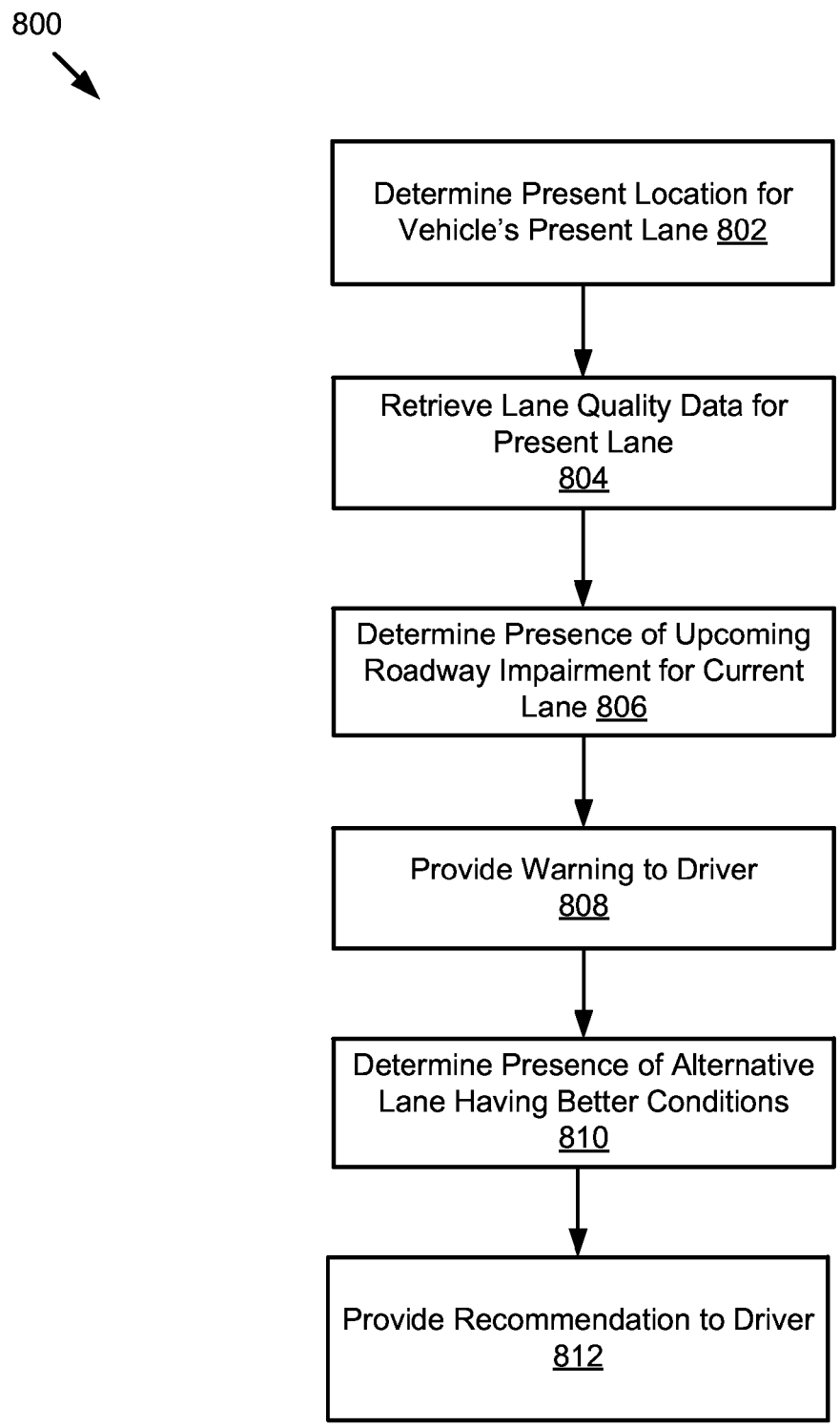
FIG. 8 is a flowchart of an example method for wirelessly receiving lane quality data from a network and providing a recommendation to a driver.

Turning now to FIG. 8. FIG. 8 is a flowchart of an example method 800 for wirelessly receiving lane quality data 381 from a network 105 and providing a recommendation to a driver. In some implementations, one or more blocks of the method 800 may be performed by the electronic device 300 described above with reference to FIG. 3.

At block 802, the location for the present location of the vehicle 123 is determined. The location of the vehicle 123 may describe the present lane which the vehicle 123 is currently using for travel. The present lane of the vehicle 123 may also be determined based on the location data 382 describing the present location of the vehicle 123, images captured by external cameras mounted to the vehicle 123, or data from one or more other sensors included in the vehicle 123 and configured to enable the electronic device 300 to determine the current lane of the vehicle 123.

At block 804, lane quality data 381 may be retrieved. For example, the lane quality data 381 may be retrieved from the memory 327. The lane quality data 381 may be retrieved based on the present location of the vehicle. At block 806, the presence of an upcoming roadway impairment for the present lane of the vehicle 123 may be determined. The presence of the upcoming roadway impairment may be determined based on the present location of the vehicle and the lane quality data. At block 808, a warning describing the upcoming roadway impairment may be provided to the driver. At block 810, the presence of one or more alternative lanes having better riding conditions may be determined. At block 812, a recommendation to move to the alternative lane may be provided to the driver.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A system of a vehicle comprising:
a back-up camera mounted to an exterior of the vehicle;
one or more vibration sensors mounted to the vehicle and configured to measure sensor data describing a roadway impairment for a current lane of a roadway; and
an onboard vehicle computer including a lane quality application and a processor, the lane quality application stored in a non-transitory tangible memory communicatively coupled to the processor, wherein the lane quality application, responsive to being executed by the processor, causes the processor to execute steps comprising:
determining, based on the sensor data of the vehicle, a capture time for executing the back-up camera;
executing the back-up camera at the capture time, wherein (1) the capture time is configured so that the back-up camera captures an image of a portion of the current lane which includes the roadway impairment described by the sensor data and (2) the image captured by the back-up camera is described by image data;
determining location data describing a current geographic location of the roadway impairment; and
creating a log that describes the sensor data, the image data and the location data associated with the roadway impairment.

2. The system of claim 1, further comprising a communication unit configured to enable the onboard vehicle computer to wirelessly communicate with a network.

3. The system of claim 2, wherein the lane quality application, responsive to being executed by the processor, causes the processor to execute a further step comprising transmitting log data describing the log to the network.

4. The system of claim 2, wherein the communication unit is configured to receive Dedicated Short Range (DSRC) communications including other sensor data from one or more other vehicles.

5. The system of claim 2, wherein the communication unit receives lane quality data from the network and the lane quality data is specific for a geographic region and describes which lanes for the geographic region have roadway impairments.

6. The system of claim 5, wherein the lane quality data further describes one or more portions of the lanes that are determined to be impaired.

7. The system of claim 6, wherein the lane quality data further describes a type of roadway impairment associated with each portion of the lanes that are determined to be impaired.

8. The system of claim 2, wherein the communication unit receives lane quality data from the network and the lane quality data describes a map for a geographic area depicting which lanes of the roadway have roadway impairments, the portions of the lanes that are actually impaired and a type of roadway impairment associated with each portion of the lanes that are determined to be impaired.

9. The system of claim 5, wherein the lane quality data is determined by a lane quality server including a cloud server communicatively coupled to the network and the lane quality data is determined based at least in part on the log data which is transmitted to the network by the communication unit.

10. The system of claim 9, wherein the vehicle is included in a fleet of vehicles and the lane quality data is determined based at least in part on the log data and other log data received from one or more other vehicles included in the fleet of vehicles.

11. The system of claim 5, wherein the lane quality application, responsive to being executed by the processor, causes the processor to execute further steps comprising:
determining a present geographic location for a present lane being traveled in by the vehicle;
retrieving the lane quality data associated with the present lane; and
determining, based on the present geographic location and the lane quality data, (1) a presence of an upcoming roadway impairment for the present lane and (2) an alternative lane to be traveled in by the vehicle which does not presently include roadway impairments.

12. The system of claim 11, wherein the lane quality application, responsive to being executed by the processor, causes the processor to provide a recommendation to the driver to travel in the alternative lane.

13. The system of claim 12, wherein the alternative lane does not include roadway impairments for a range of 0.01 to 10 miles.

14. The system of claim 11, wherein the vehicle is an autonomous vehicle, and the lane quality application, responsive to being executed by the processor, causes the vehicle to change lanes to the alternative lane.

15. The system of claim 11, wherein the vehicle is a semi-autonomous vehicle, and the lane quality application, responsive to being executed by the processor, causes the vehicle to change lanes to the alternative lane.

16. The system of claim 15, wherein the vehicle changes lanes to the alternative lane without input from a driver of the vehicle.

17. The system of claim 14, wherein the vehicle warns other vehicles on the roadway before the vehicle changes lanes to the alternative lane.

18. The system of claim 17, wherein the vehicle warns the other vehicles by broadcasting a warning via DSRC.

19. A method comprising:
measuring, using a vibration sensor mounted to a vehicle, sensor data describing a roadway impairment for a current lane of a roadway being traveled in by the vehicle;
determining, based on sensor data of the vehicle, a capture time for executing a back-up camera mounted to the vehicle;
executing the back-up camera at the capture time, wherein (1) the capture time is configured so that the back-up camera captures an image of the current lane which includes the roadway impairment described by the sensor data and (2) the image captured by the back-up camera is described by image data;
determining location data describing a current geographic location of the roadway impairment;
creating a log that describes the sensor data, the image data and the location data associated with the roadway impairment;
transmitting log data describing the log to a network;
receiving lane quality data from the network, wherein the lane quality data is based on the log data and specific for a geographic region and describes which lanes of the roadway have roadway impairments, a portion of the lanes that are actually impaired and a type of roadway impairment associated with each portion of the lanes that are determined to be impaired;

determining a present geographic location for a present lane being traveled in by the vehicle;

retrieving, from a non-transitory tangible memory, the lane quality data associated with the present geographic location; and determining, based on the lane quality data and the present geographic location, (1) a presence of an upcoming roadway impairment for the present lane and (2) an alternative lane to be traveled in by the vehicle, wherein the alternative lane does not presently include roadway impairments.

20. A non-transitory tangible memory of a mobile device comprising computer code which, when executed by an electronic device, causes the electronic device to perform steps comprising:

receiving lane quality data from a network, wherein the lane quality data is specific for a geographic region and describes which lanes of a roadway have roadway impairments, a portion of the lanes that are actually impaired and a type of roadway impairment associated with each portion of the lanes that are determined to be impaired;

determining a present geographic location for a present lane being traveled in by a vehicle;

retrieving, from the tangible memory, the lane quality data associated with the present lane;

determining, based on the lane quality data and the present geographic location, (1) a presence of an upcoming roadway impairment for the present lane and (2) an alternative lane to be traveled in by the vehicle, wherein the alternative lane does not presently include roadway impairments; and providing a warning to a driver of the vehicle that the present lane includes the upcoming roadway impairment and describing an opportunity to travel in the alternative lane which does not presently include roadway impairments.

* * * * *